(12) United States Patent
Ruckstuhl

(10) Patent No.: US 8,770,092 B2
(45) Date of Patent: Jul. 8, 2014

(54) BREWING UNIT FOR A COFFEE MACHINE

(75) Inventor: Stephan Ruckstuhl, Neuendorf (CH)

(73) Assignee: Egro Suisse AG (CH)

( * ) Notice: Subject to any disclaimer, the term of this patent is extended or adjusted under 35 U.S.C. 154(b) by 504 days.

(21) Appl. No.: 12/867,838

(22) PCT Filed: Feb. 9, 2009

(86) PCT No.: PCT/CH2009/000051
§ 371 (c)(1),
(2), (4) Date: Nov. 11, 2010

(87) PCT Pub. No.: WO2009/100552
PCT Pub. Date: Aug. 20, 2009

(65) Prior Publication Data
US 2011/0041697 A1  Feb. 24, 2011

(30) Foreign Application Priority Data
Feb. 17, 2008  (CH) ..................................... 219/08

(51) Int. Cl.
*A47J 31/40* (2006.01)
*A47J 31/20* (2006.01)

(52) U.S. Cl.
USPC .............................................. 99/287; 99/297

(58) Field of Classification Search
USPC ............... 99/284, 287, 289 R, 294, 297, 300, 99/302 R, 302 P
See application file for complete search history.

(56) References Cited

U.S. PATENT DOCUMENTS

| 5,302,407 A | 4/1994 | Vetterli |
| 5,551,988 A | 9/1996 | Reyhanloo et al. |
| 2007/0012194 A1* | 1/2007 | Oehninger ...................... 99/279 |

FOREIGN PATENT DOCUMENTS

| EP | 0 561 741 A1 | 3/1993 |
| EP | 0 658 330 A1 | 12/1994 |
| WO | 2007/060694 A1 | 5/2007 |

* cited by examiner

*Primary Examiner* — Tu B Hoang
*Assistant Examiner* — Lindsey C Teaters
(74) *Attorney, Agent, or Firm* — Sughrue Mion, PLLC

(57) ABSTRACT

The invention relates to a brewing unit (1) for a coffee maker for brewing a ground coffee portion (10), comprising a brewing unit housing (2), an upper plunger (3) firmly connected to the brewing unit housing (2), a holder (4) for receiving the ground coffee portion (10), said holder being open at the top and closed at the bottom by a base (7), and a brewing plunger (6) for compressing the ground coffee portion (10) in a brewing chamber (5). The holder (4) and the brewing plunger (6) are disposed movably and pivotally in the brewing unit housing (2). Mechanical operating elements are provided in the brewing unit housing (2) for raising, lowering, and pivoting the holder (4) and the plunger (3). The brewing plunger (6) is hydraulically guided displaceably in the holder (4) relative to the holder (4). Between the brewing plunger bottom side (14) and the base (7) of the holder (4) a lower chamber space (13) is provided, into which the hot water supply (8) opens. The brewing plunger (3) has a passage (11) for the hot water, said passage being provided with a valve (12) and connecting the lower chamber space (13) to the brewing chamber (5). When supplying pressurized hot water via the hot water supply (8) in the lower chamber space (13), overpressure is created there, by which the brewing plunger (6) can be hydraulically pressed in the direction of the brewing chamber (5).

7 Claims, 4 Drawing Sheets

BREWING UNIT FOR A COFFEE MACHINE

CROSS REFERENCE TO RELATED APPLICATIONS

This application is a National Stage of International Application No. PCT/CH2009/000051 filed Feb. 9, 2009, claiming priority based on Swiss Patent Application No. 219/08 filed Feb. 17, 2008, the contents of all of which are incorporated herein by reference in their entirety.

The present invention relates to a brewing unit for a coffee machine for brewing a ground coffee (coffee powder) portion, in particular for the so-called "espresso machines", in which the proportioning and delivery of the coffee powder before the preparation of the beverage, as well as the removal of the exhausted coffee powder after the preparation of the beverage take place more or less automatically, and which allow preparing a desired number of portions of fresh coffee in succession.

For instance, it is known an apparatus for preparing coffee with a housing, a fresh water connection or a fresh water tank, a heating member for heating the fresh water, a device for sending the heated fresh water under pressure to a brewing chamber, which is equipped with a sealing member and with an inlet for the beverage powder as well as with an outlet for the beverage, a device for expelling or removing the exhausted beverage powder from the brewing chamber, as well as drive and control means for said devices. The brewing chamber includes a cylindrical sleeve with a displaceable plunger arranged therein and a sealing member by which the sleeve can be sealed. In this way, a chamber space is created that serves for receiving the beverage powder. By introducing the heated water under pressure into the chamber space, the beverage powder present therein is brewed and the finished beverage comes out through an outlet. An inlet for the beverage powder is required for feeding the chamber space, and the emptying the brewing chamber after the preparation of the beverage has occurred takes place through a relative displacement between the sleeve and the plunger, causing an expulsion of the powder tablet. Then, the brewing chamber is pivoted to the starting position, and the powder tablet is removed by a wiping member and falls into a collecting container. Subsequently, after retracting the plunger, the chamber space can be filled with fresh powder and the machine is ready for preparing the next beverage. In the described apparatus, the sleeve with the plunger and the sealing member forms the brewing chamber with a predetermined volume. That is, after the brewing chamber has been filled with the coffee powder, the latter is compressed and then the brewing process occurs. Now, for preparing different coffee beverages, on the one side the brewing chamber is filled with more or less coffee, and on the other side the amount of water by which the coffee powder is brewed is changed. For an optimum quality of a given beverage, however, among other factors also the packing density of the coffee powder is of relevance, i.e. the pressure with which the coffee powder is compressed before or during the brewing process should be always the same. This is not attainable with a brewing chamber with predetermined and fixed volume, which is filled with different amounts of coffee powder.

It is the object of the present invention to develop a brewing unit for a coffee machine of the kind discussed above in such a manner that the drawbacks previously explained are substantially obviated, and to improve the brewing unit in such a manner that the compression pressure when compressing the portion of coffee powder is controllable as desired. In principle, this compression pressure can be electrically, hydraulically or pneumatically controlled. However, the subject matter of the invention is limited to a hydraulic compression device.

This object is achieved by means of a brewing unit having the features of patent claim 1. Further features and advantages of the present invention will be explained with the help of the following description of a preferred exemplary embodiment, in particular with reference to the accompanying drawings.

In the drawings.

In the Figures, the same reference symbols are used for the same elements, and the initial explanations apply to all Figures, unless the contrary is explicitly stated.

Figure 1:
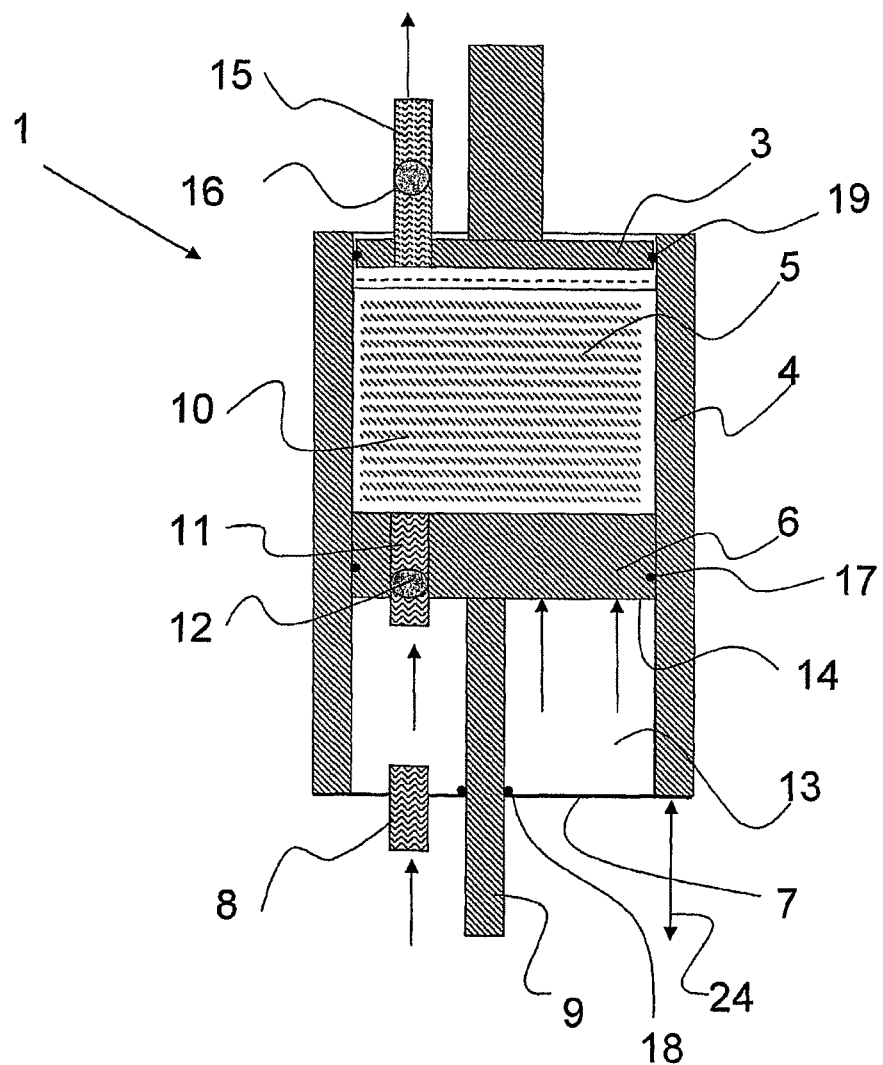
FIG. 1 shows a schematic cross-sectional representation of the brewing chamber of a brewing unit.

In FIG. 1, the basic elements of the brewing unit according to the invention are schematically shown in cross-section in correspondence of the brewing chamber. The principle of the brewing unit and its way of operating will be explained with reference to such a representation. Brewing unit 1 for a coffee machine for brewing a coffee powder portion includes a housing of the brewing unit, not shown in the drawing, a sleeve 4, open at the top and closed at the bottom by a base 7, in which the coffee powder portion is introduced, an upper plunger 3 and a brewing plunger 6 for compressing coffee powder portion 10 in a brewing chamber 5. Upper plunger 3 is fixedly connected with the housing of the brewing unit, sleeve 4 and brewing plunger 6 are movably and pivotally arranged in housing 2 of the brewing unit, brewing plunger 6 being in addition mechanically and hydraulically displaceable relative to sleeve 4. Hot water supply duct 8 opens in base 7 of sleeve 4. A passage for hot water, equipped with a valve 12, is provided in brewing plunger 6. Passage 11 connects the lower chamber space between sleeve base 7 and bottom face 14 of the brewing plunger with brewing chamber 5. In turn, the brewing chamber is bounded by sleeve 4, brewing plunger 6 and upper plunger 3. Upper plunger 3 further has an outlet 15 for the beverage with outlet valve 16.

When a coffee beverage is being prepared, a coffee powder portion is first filled into sleeve 4 at a filling position. Then, sleeve 4 is pivoted from a filling position to a brewing position and is moved upwards, as shown in FIG. 1 by double arrow 24, so that upper plunger 3, fixedly mounted in the brewing chamber housing, engages sleeve 4 and tightly seals sleeve 4 at the top. Brewing plunger 6 is also mechanically moved upwards. FIG. 1 illustrates the state of brewing chamber 5 at this time point of the preparation of the coffee beverage. Coffee powder portion 10 is compressed in brewing chamber 5 and the supply of pressurised hot water takes place through water intake 8. Valve 12 is still closed, so that an overpressure is set up in lower chamber space 13. Brewing plunger 6 is hydraulically pushed by that overpressure in the direction of brewing chamber 5. A compression of the coffee powder takes place. As soon as a given overpressure, predetermined by valve 12, acts on bottom face 14 of the brewing plunger, valve 12 opens and hot water arrives into brewing chamber 5, where it is made to pass under pressure through the compressed coffee powder portion 10 and flows out through outlet 15 for the beverage and outlet valve 16. Thanks to the hydraulic compression of coffee powder portion 10, it is ensured that even in case of different amounts of coffee powder in brewing chamber 5 the coffee powder is always brewed with the same compression pressure. Emptying of brewing chamber 5 after the preparation of the beverage has taken place is carried out by lowering sleeve 4 and by a relative movement of sleeve 4 and brewing plunger 6, causing an expulsion of powder tablet 10. Then, sleeve 4 is pivoted to the starting position and powder tablet 10 is removed by a wiping and falls into a collecting container. Subsequently, after retracting brewing plunger 6, the chamber space can be filled with fresh powder and the machine is ready for preparing the next beverage.

The mechanical actuating members necessary for raising and lowering or respectively pivoting sleeve 4 and plunger 6, which members too are housed in the housing of the brewing unit, are not shown in the drawings and we will not go in further details about the structure of the whole kinematics of the driving and actuating members in the frame of the present invention, since such a structure is not a subject matter of the apparatus according to the invention.

Figure 2:
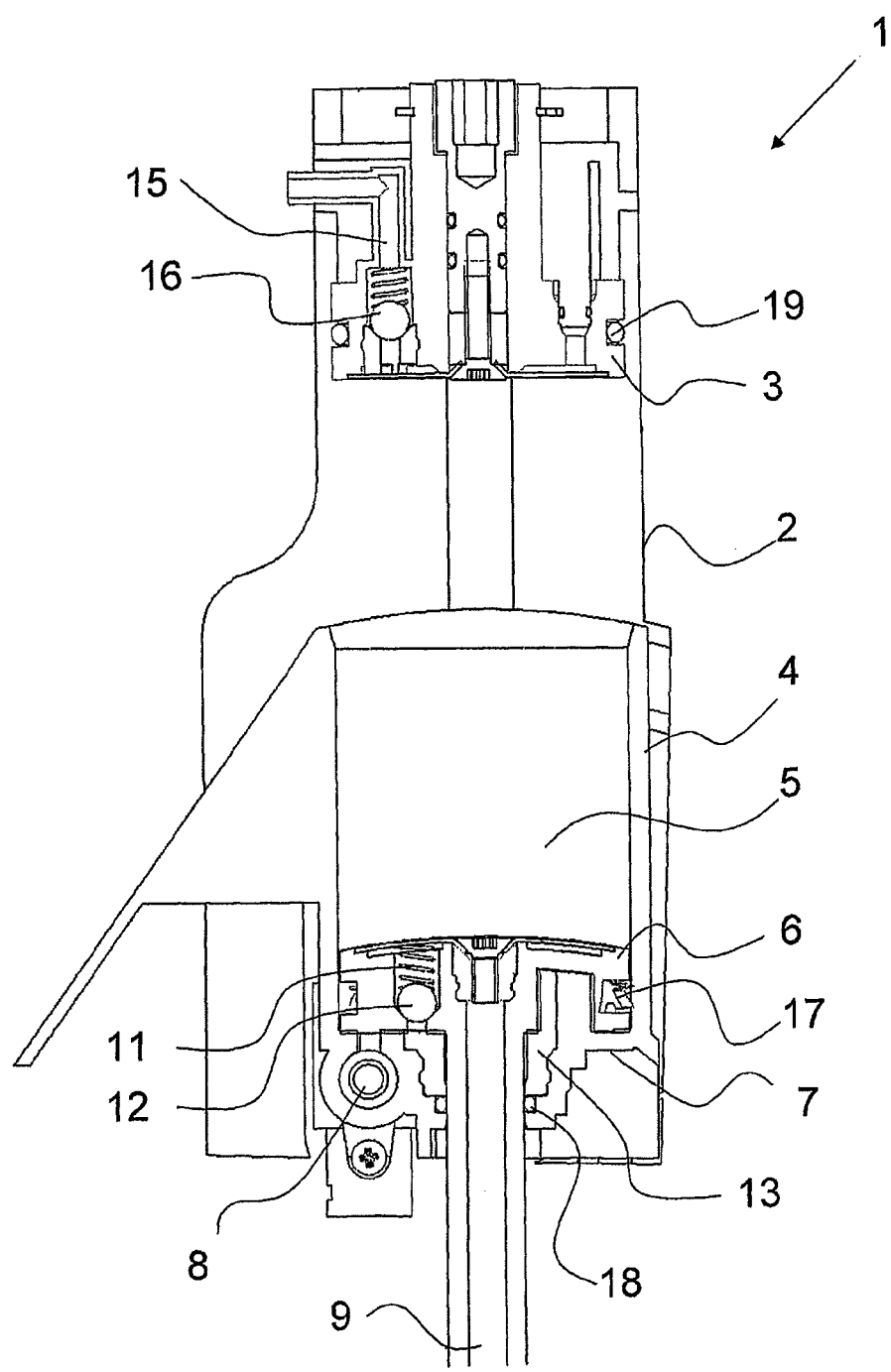
FIG. 2 shows a schematic sectional representation of a brewing unit with the brewing chamber retracted and the plunger are retracted.

FIG. 2 shows a sectional representation of an exemplary embodiment of the brewing unit according to the invention, with retracted sleeve 4 and retracted brewing plunger 6. Moreover, in the top portion, there is upper plunger 3, fixedly connected to housing 2 of brewing unit 1, with outlet 15 for the beverage and outlet valve 16. Brewing plunger 6 finds itself in the lowest possible position and sleeve 4 is ready for being filled with coffee powder. To this aim, sleeve 4 is pivoted to the right and takes the filling position. After filling, sleeve 4 is pivoted back to the previous starting position and moves upwards until upper plunger 3 engages sleeve 4 and seals it in pressure-tight manner by means of upper plunger gasket 19. Simultaneously with the sleeve, also brewing plunger 6 is moved upwards. As soon as sleeve 4 has taken the uppermost position and brewing chamber 5 is closed in pressure-tight manner, hot water flows into lower chamber space 13 through hot water supply duct 8. That space is sealed in pressure-tight manner towards the outside by plunger gasket 17 in respect of brewing plunger 6 and by plunger rod gasket 18 in respect of plunger rod 9, so that an overpressure can be set up in lower chamber space 13. Brewing plunger 6 is hydraulically displaced upwards in the direction of brewing chamber 5 by the overpressure in lower chamber space 13. This situation is shown in FIG. 3.

Figure 3:
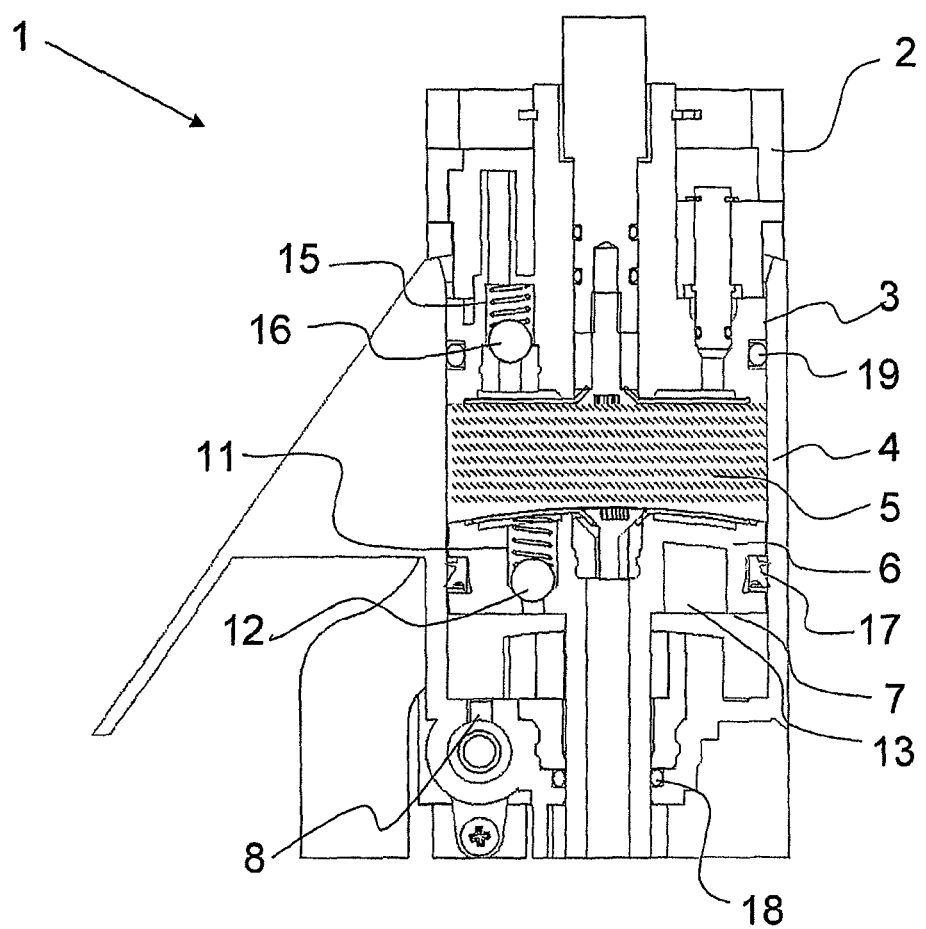
FIG. 3 shows a schematic sectional representation of a brewing unit with the brewing chamber moved upwards and the plunger moved upwards.

FIG. 3 is a schematic sectional representation of brewing unit 1 with sleeve 4 moved upwards and brewing plunger 6 moved upwards. Valve 12 is still closed, that is, the pressure in lower chamber space 13, and therefore the compression pressure in brewing chamber 5, has not yet attained the desired value. As soon as the compression pressure predetermined by valve 12 is attained, valve 12 opens and the hot water flows into brewing chamber 5, where also a hydrostatic pressure is set up during the brewing phase, until the pressure predetermined by outlet valve 16 is attained and the beverage flows out through outlet 15 for the beverage.

Figure 4:
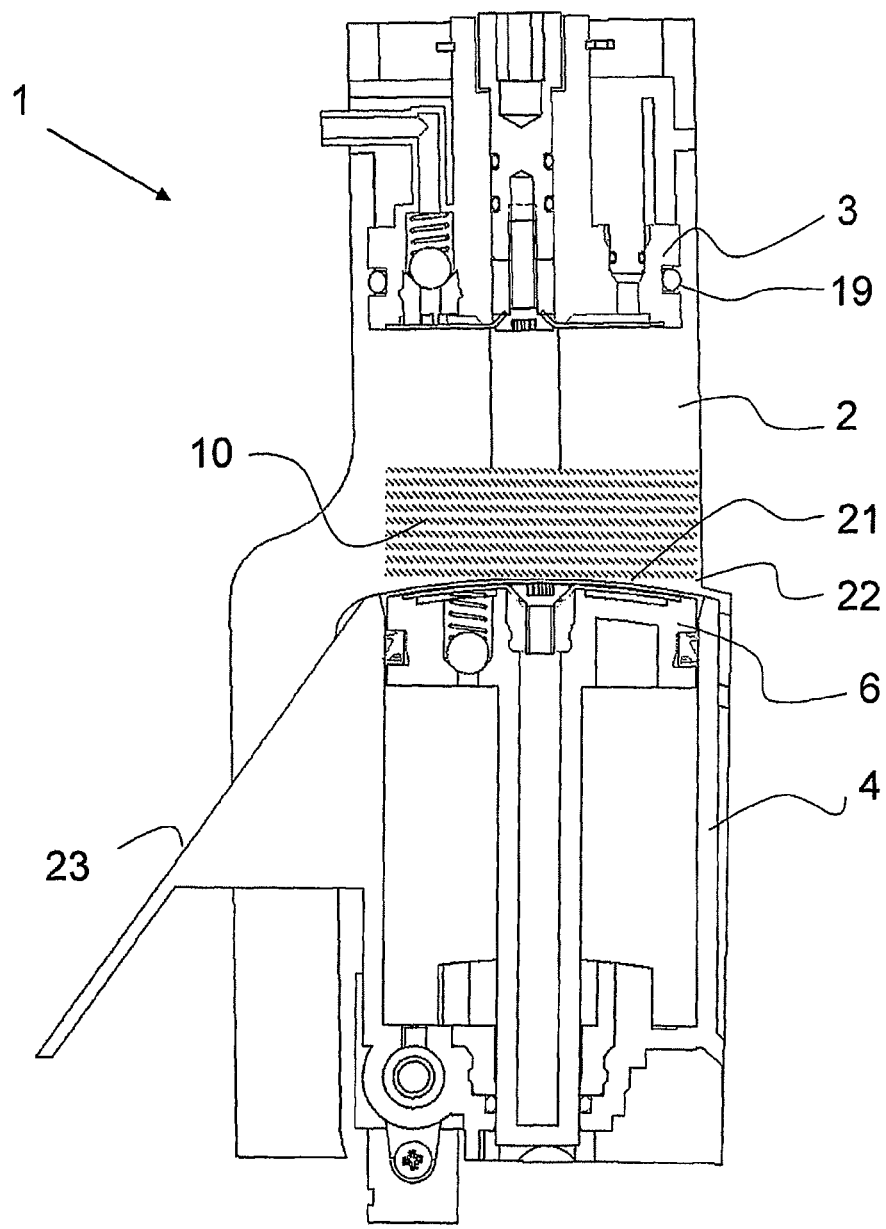
FIG. 4 shows a schematic sectional representation of a brewing unit with the brewing chamber retracted and the plunger moved upwards.

FIG. 4 is a schematic sectional representation of brewing unit 1 with sleeve 4 retracted and brewing plunger 6 moved upwards. Brewing unit 1 finds itself in this condition after the brewing process. Sleeve 4 is lowered and brewing plunger 6 remains in the upper position. By such a relative movement between brewing plunger 6 and sleeve 4, coffee powder tablet 10 is pushed out from sleeve 4 and is deposited on upper surface 21 of the brewing plunger. Then, sleeve 4 is pivoted to the starting position—to the right in the drawing—and powder tablet 10 is removed by a wiping at edge 22 of housing 2 of the brewing unit and falls into a collecting container through a chute 23 formed on sleeve 4. To ensure a clean wiping of powder tablet 10 from surface 21 of the brewing plunger, such a surface has a convexity whose radius of curvature corresponds to the pivoting radius of sleeve 4. While sleeve 4 is being pivoted with brewing plunger 6, the whole surface 21 of the brewing plunger moves at a minimum distance along housing edge 22 and is cleaned off from coffee powder residuals. Subsequently, after retracting brewing plunger 6, sleeve 4 can be filled with fresh powder and the machine is ready for preparing the next beverage.

Thanks to the hydraulic compression of coffee powder portion 10, this brewing unit according to the invention allows the coffee powder to be brewed always with the same compression pressure also in case of different amounts of coffee powder in brewing chamber 5. In this manner, with only one brewing unit 1 or with only one brewing chamber 5, it is possible to prepare with the same compression pressure conditions during the brewing process different coffee beverages, for the preparation of which respective different amounts of coffee powder are employed.

The invention claimed is:
1. A brewing unit for a coffee machine for brewing a coffee powder portion, comprising:
   a housing of the brewing unit,
   an upper plunger having a beverage outlet, the upper plunger is fixedly connected with the housing of the brewing unit,
   a sleeve, open at a top of the sleeve and closed at a bottom of the sleeve by a base, the sleeve configured to receive the coffee powder portion,
   a brewing plunger for compressing the coffee powder portion in a brewing chamber, the sleeve and the brewing plunger being movably and pivotally arranged in the housing of the brewing unit,
   mechanical actuating members for:
      raising and lowering the sleeve and the brewing plunger arranged in the housing of the brewing unit to perform brewing in a brewing position, and
      pivoting the sleeve and the brewing plunger arranged in the housing of the brewing unit after the end of the brewing to a cleaning position to perform expulsion of the coffee powder portion after brewing and to a filling position for insertion of the coffee powder portion;
   the brewing plunger being mechanically and hydraulically guided in the sleeve so as to displace relative to the sleeve, the upper plunger being maintained stationary relative to the housing of the brewing unit while the sleeve and the brewing plunger move from the filling position to the brewing position and to the cleaning position;
   a lower chamber space, where a hot water supply duct ends fixedly connected to the sleeve, said lower chamber space provided in the sleeve between the base of the sleeve and a bottom face of the brewing plunger, the brewing plunger having a plunger duct for hot water, the plunger duct is equipped with an inlet valve and connects the lower chamber space with the brewing chamber, wherein, by supplying pressurised hot water through the supply duct, an overpressure can be created in the lower chamber space and the brewing plunger can be hydraulically pushed in the direction of the brewing chamber until the inlet valve opens and the hot water flows into the brewing chamber;
   wherein the upper plunger fixedly connected with the housing of the brewing unit further comprises an outlet valve configured to open when a predetermined pressure is attained in the brewing chamber whereby a brewed beverage can flow out through the outlet only when the outlet valve opens.

2. Brewing unit according to claim 1 wherein the brewing plunger has a convex surface whose radius of curvature corresponds to a pivoting radius of the sleeve.

3. The brewing unit according to claim 2, wherein the lower chamber space is sealed from the outside in pressure-tight manner by a plunger gasket associated with the brewing plunger and by a plunger rod gasket associated with a plunger rod of the brewing plunger.

4. Brewing unit according to claim 1, wherein the lower chamber space is sealed from the outside in pressure-tight manner by a plunger gasket associated with the brewing plunger and by a plunger rod gasket associated with a plunger rod of the brewing plunger.

5. A brewing unit for a coffee machine for brewing a beverage using a portion of coffee powder, comprising:
 a housing;
 an upper plunger having a beverage outlet, the upper plunger is mounted in a fixed manner to the housing to be stationary relative to the housing throughout the brewing of the portion of coffee powder;
 a sleeve open at a top end of the sleeve and closed at a bottom end of the sleeve by a base, the sleeve configured to receive the portion of coffee powder;
 a lower plunger for compressing the portion of coffee powder in a brewing chamber formed by the sleeve, the upper plunger and the lower plunger, the sleeve and the lower plunger movable in the housing;
 mechanical actuators configured to raise and lower the sleeve and the lower plunger in the housing of the brewing unit and to pivot the sleeve and the lower plunger, so that the mechanical actuators move the lower plunger downwards relative to the sleeve and move the sleeve and the lower plunger from a brewing position to a filling position wherein a new portion of coffee powder is received in the sleeve while the upper plunger remains fixedly connected with and stationary relative to the housing of the brewing unit;
 a lower chamber connected to a hot water supply duct, the lower chamber provided in the sleeve between the base of the sleeve and a bottom face of the lower plunger, the lower plunger having a plunger duct for hot water;
 an inlet valve and an intermediate duct that controls flow of hot water from the lower chamber to the brewing chamber, so that pressure can be developed in the lower chamber before the inlet valve opens; and
 an outlet valve associated with the beverage outlet and configured to open when a predetermined pressure is attained in the brewing chamber to thereby allow the beverage to flow out through the outlet.

6. The brewing unit of claim 5, wherein, the hot water supply duct is fixedly connected to the base of the sleeve.

7. The brewing unit of claim 5, wherein the sleeve and the lower plunger are configured to be pivoted within the housing from a brewing position to a cleaning position, wherein the portion of coffee powder used for brewing is expelled.

* * * * *